Aug. 10, 1926.
C. F. MEYER
1,595,521
TEST-OUT VALVE
Filed Feb. 11, 1922
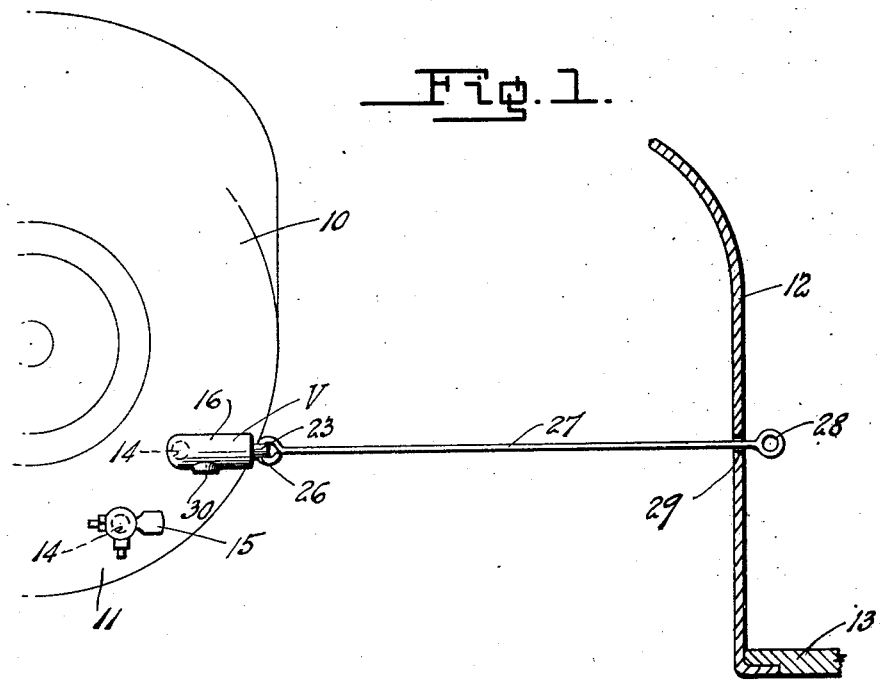
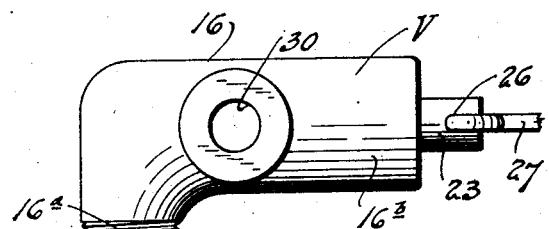
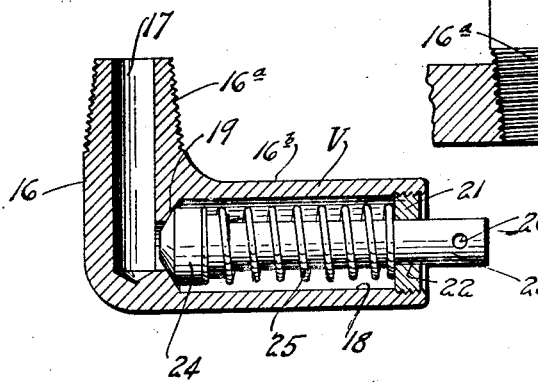
Inventor
Carl Fred Meyer
By Watson E. Coleman
Attorney Patented Aug. 10, 1926.

1,595,521

UNITED STATES PATENT OFFICE.

CARL FRED MEYER, OF NEW BRUNSWICK, NEW JERSEY.

TEST-OUT VALVE.

Application filed February 11, 1922. Serial No. 535,823.

This invention relates to test out valves for oil reservoirs, and more particularly to a test out valve for the oil reservoir of automobile engines of the type employed in the Ford automobile.

In the type of automobile above mentioned, the oil reservoir is substantially transversely aligned with the running board shields at the sides of the car and is provided with test out openings extending longitudinally of the car. These openings are usually engaged by pet cocks which the operator of the vehicle, when the desires to find the depth of oil in the reservoir, is obliged to reach beneath the running board to turn. This method of testing the depth of oil is of course extremely inconvenient and hard upon the clothes of the operator and the testing is accordingly often neglected, resulting in the oil getting too low in the reservoir to the detriment of the engine.

An important object of this invention accordingly becomes to provide an improved test out cock having an operating mechanism accessible without stooping below the running board.

A still further object of the invention is to provide a device of this character which when opened to test the height of oil in the reservoir will automatically close.

These and other objects I attain by the construction and arrangement shown in the accompanying drawings wherein for the purpose of illustration is shown a preferred embodiment of my invention and wherein like reference characters designate like parts throughout.

In the drawings:

Figure 1 is a fragmentary sectional view taken through an automobile showing my invention applied thereto;

Figure 2 is an enlarged bottom plan view of the test out cock; and

Figure 3 is a longitudinal sectional view taken therethrough.

Referring now more particularly to the drawings, the numeral 10 designates the engine of an automobile provided in the base thereof with an oil reservoir 11 which is substantially transversely aligned with the running board shield 12 of the running board 13. The reservoir 11 is provided with upper and lower test out openings 14 which are usually provided with pet cocks 15.

In accordance with my invention, the upper pet cock 15 is removed and substituted by my improved test out valve V. This valve consists of an L-shaped fitting 16, one arm 16$^a$ of which is exteriorly threaded for engagement in the test out opening. The fitting 16 is provided with a longitudinal bore 17. The bore 17 of the fitting 16 is enlarged in the arm 16$^b$ thereof, as at 18, and at the enlargement the wall of the fitting forms a valve seat 19.

The end of the enlarged bore 18 is internally screw threaded for coaction with a screw threaded guide plug 21 having a bore 22 which slidably receives the stem 23 of a valve 24 coacting with the seat 19. A spring 25 is disposed intermediate the plug 21 and the valve 24 and normally forces this valve into engagement with the seat. The end of the valve stem projects exteriorly of the plug and is provided with an opening 26 for engagement by an operating stem 27 having a finger receiving ring 28.

In the use of my device the upper pet cock is removed and the L-fitting 16 substituted therefor, the fitting being arranged so that the arm 16$^b$ thereof is directed toward the adjacent running board shield 12. An opening 29 is then formed in the running board shield in alignment with the arm 16$^b$ of the fitting and the operating stem 27 inserted therethrough and engaged in the opening 26 of the valve stem. The operating stem 27 is of a length greater than the normal distance between the opening 26 of the valve stem 23 and the exterior surface of the running board shield in order that when the machine is placed under strain as when passing over a bump or the like, the valve will not be opened, the distance between these points changing when the machine passes over a bump placing a strain thereon. The arm 16$^b$ of the angle fitting 16 is provided in what is the lower side thereof when the fitting is in the proper position with an opening 30 communicating with the enlarged bore 18. When it is desired to test the height of the oil which should be at all times high enough to pass from the upper pet cock of the reservoir, this may be done by engaging the finger ring of the operating stem 27 and shifting the same longitudinally, withdrawing the valve from its seat and permitting oil in the reservoir to flow from the opening 30. Immediately upon its release the valve is again seated by the spring 25 and the flow of oil through the opening cut off.

From the foregoing it is believed to be obvious that a test out device constructed in accordance with my invention is particularly well adapted for the use for which it is intended by reason of the fact that it eliminates the necessity of the operator reaching beneath the running board to test the depth of the oil in the reservoir and by reason of the fact that it eliminates all danger of accidental opening of the valve due to unusual strain placed upon the machine. It will furthermore be obvious that the construction thereof as hereinbefore set forth is capable of some change and modification without materially departing from the spirit of my invention and I accordingly do not limit myself to the specific structure thereof except as hereinafter claimed.

I claim:

In a test out device for the oil reservoirs of automobiles having a reservoir substantially transversely aligned with the running board of the vehicle, the reservoir having horizontal test out openings directed longitudinally of the automobile, the combination of an integral L-shaped fitting having one arm thereof externally threaded for engagement in a test out opening and provided with a continuous bore, the bore being enlarged in the second arm, said second arm being directed toward the adjacent running board shield, a spring seated valve closing communication between the enlarged portion of the bore of the fitting and the remainder of the bore and of considerably less diameter than the bore, a single downwardly directed port in the wall of the second arm adjacent the seat of said valve and beyond which said valve is withdrawable, and an operating and supporting stem for said valve and a plug threaded in and closing the outer end of the enlarged portion of the bore and through which said stem is directed, the spring of said valve surrounding the stem between the valve and plug.

In testimony whereof I hereunto affix my signature.

CARL FRED MEYER.